United States Patent
Ortiz Egea et al.

(10) Patent No.: US 10,592,753 B1
(45) Date of Patent: Mar. 17, 2020

(54) DEPTH CAMERA RESOURCE MANAGEMENT

(71) Applicant: Microsoft Technology Licensing, LLC, Redmond, WA (US)

(72) Inventors: Sergio Ortiz Egea, San Jose, CA (US); Onur C. Akkaya, Palo Alto, CA (US); Cyrus Bamji, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/290,650

(22) Filed: Mar. 1, 2019

(51) Int. Cl.
| | |
|---|---|
| *H04N 5/00* | (2011.01) |
| *G06K 9/00* | (2006.01) |
| *H04N 5/232* | (2006.01) |
| *H04N 5/235* | (2006.01) |
| *G06K 9/32* | (2006.01) |
| *G06T 7/593* | (2017.01) |
| *H04N 5/58* | (2006.01) |

(52) U.S. Cl.
CPC ....... *G06K 9/00778* (2013.01); *G06K 9/3233* (2013.01); *G06T 7/596* (2017.01); *H04N 5/2354* (2013.01); *H04N 5/232411* (2018.08); *H04N 5/58* (2013.01)

(58) Field of Classification Search
CPC ...... G06K 9/00778; G06K 9/323; H04N 5/58; H04N 5/2354; H04N 5/232411
See application file for complete search history.

(56) References Cited

U.S. PATENT DOCUMENTS

| | | | |
|---|---|---|---|
| 2018/0146186 A1 | 5/2018 | Akkaya et al. | |
| 2019/0019302 A1* | 1/2019 | Akkaya | ........... G01S 17/10 |
| 2019/0154809 A1 | 5/2019 | Akkaya et al. | |

\* cited by examiner

*Primary Examiner* — Obafemi O Sosanya
(74) *Attorney, Agent, or Firm* — Rainier Patents, P.S.

(57) ABSTRACT

The described implementations relate to managing depth cameras. One example can include a depth camera that includes an emitter for illuminating light on a scene and a sensor for sensing light reflected from the scene. The example can also include a resource-conserving camera control component configured to determine when the scene is static by comparing captures and/or frames of the scene from the sensor. The resource-conserving camera control component can operate the depth camera in resource constrained modes while the scene remains static.

24 Claims, 14 Drawing Sheets

DEPTH CAMERA RESOURCE MANAGEMENT

BACKGROUND

The discussion relates to managing depth cameras to obtain useful information while considering resource usage.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

This discussion relates to cameras and imaging scenarios. In many use case scenarios, depth (e.g., three-dimensional '3D') cameras can offer enhanced performance compared to standard (e.g., two-dimension '2D' cameras). For instance, in surveillance scenarios, 2D cameras rely on sensing motion in a scene to trigger activation. However, motion often occurs for innocuous events (e.g., uninteresting events), such as the wind fluttering objects in the scene. Motion sensing may cause the user to be overwhelmed with these false positive scenarios where they are notified, yet nothing of interest actually occurred. Further, some events of interest, such as a slow-moving stealthy prowler may evade motion sensing (e.g., false negative). Thus, the user never receives a notification about the prowler. 3D imaging can rectify many of the shortcomings of 2D images. However, traditional operating techniques for depth cameras tend to use a relatively large amount of resources.

Many use case scenarios for depth cameras include resource constraints. For instance, surveillance scenarios may dictate the use of small, self-contained devices that are battery powered because external power is not readily available. Further, price considerations may limit the amount of hardware resources on a device, such as the size of the battery and/or the processor size. The present concepts can achieve improved results while satisfying various resource constraints. The described implementations can control depth cameras with various operational techniques to provide valuable information while utilizing fewer resources than are required for traditional depth camera operation.

FIGS. 1A-1I relate to an example scene 100 and collectively show aspects of the present concepts. (Note that the limitations of line drawings impose some simplification of the conveyed aspects).

Figure 1A:
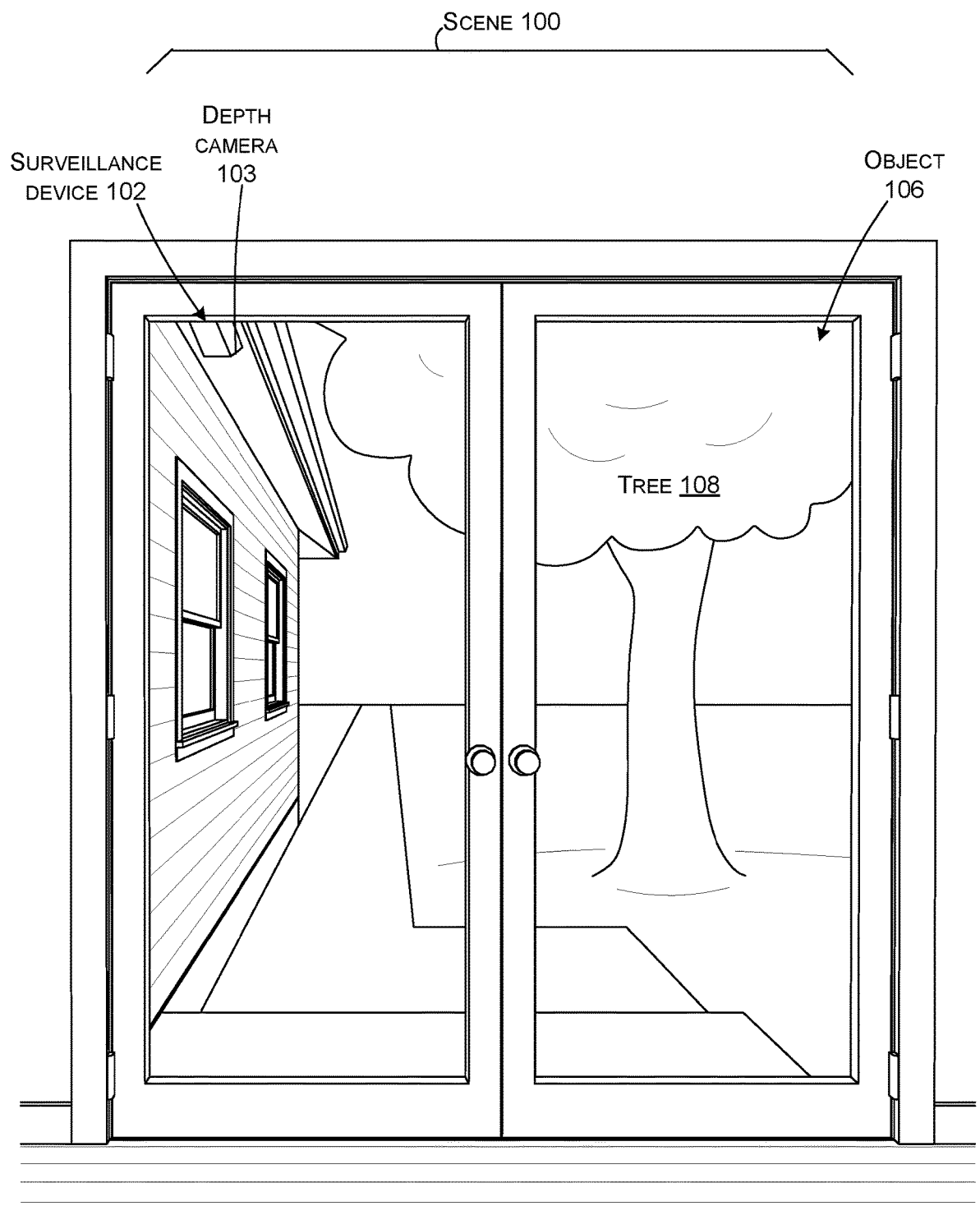
FIGS. 1A-1I show elevational views relating to an example scene to which some of the present depth camera management concepts can be applied.
Figure 1B:
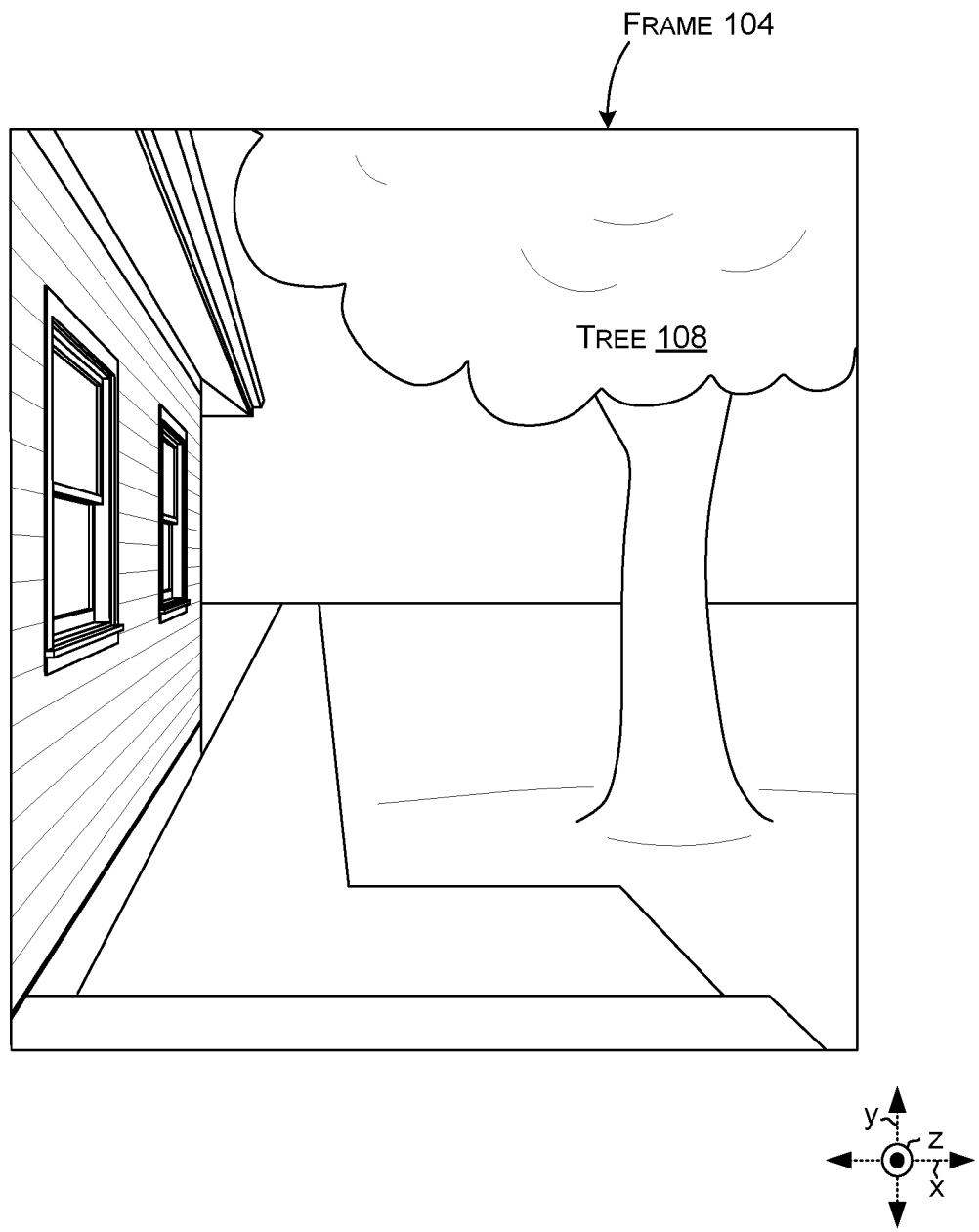
Figure 1C:
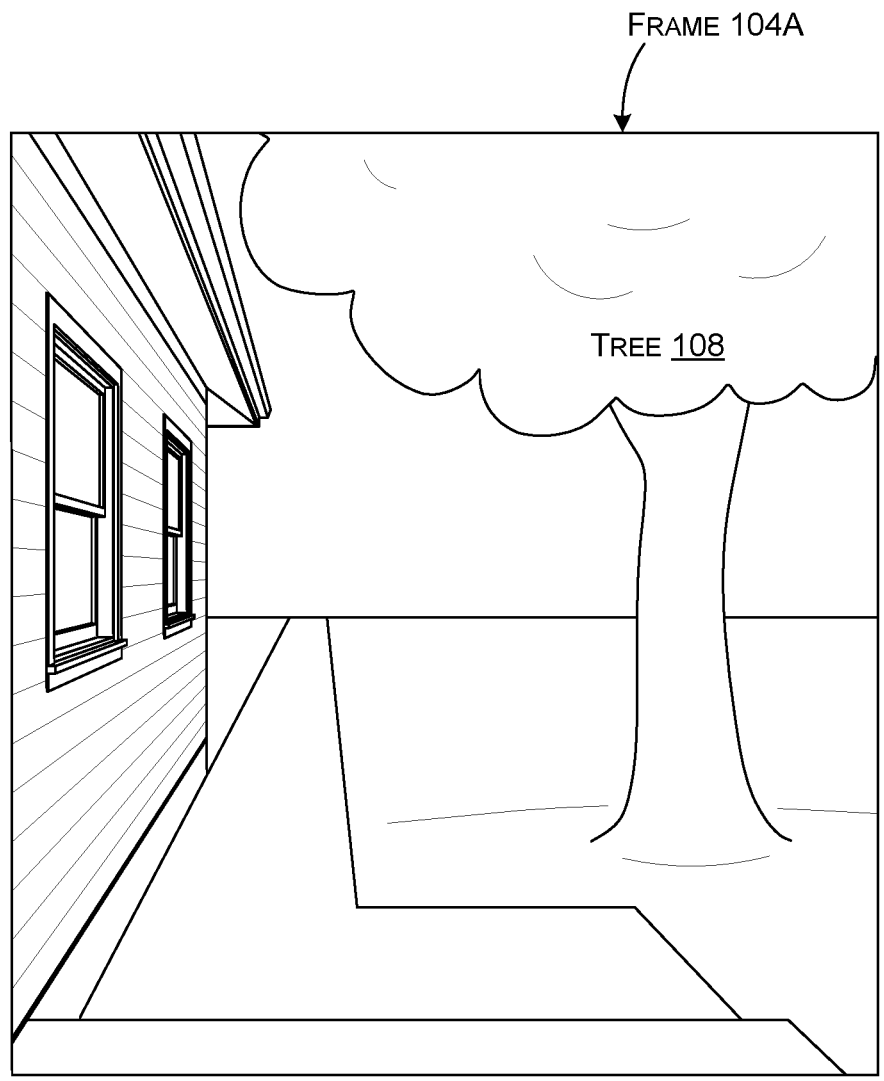
Figure 3A:
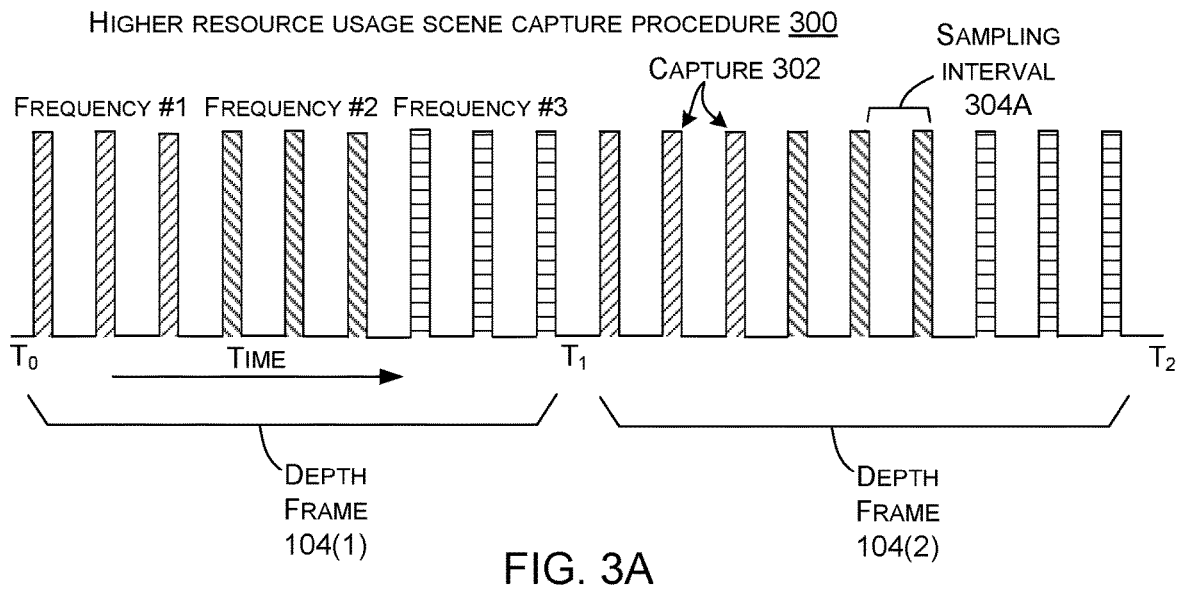
FIGS. 3A-3C and 4 show example frame acquisition aspects in accordance with some implementations of the present concepts.
Figure 3B:
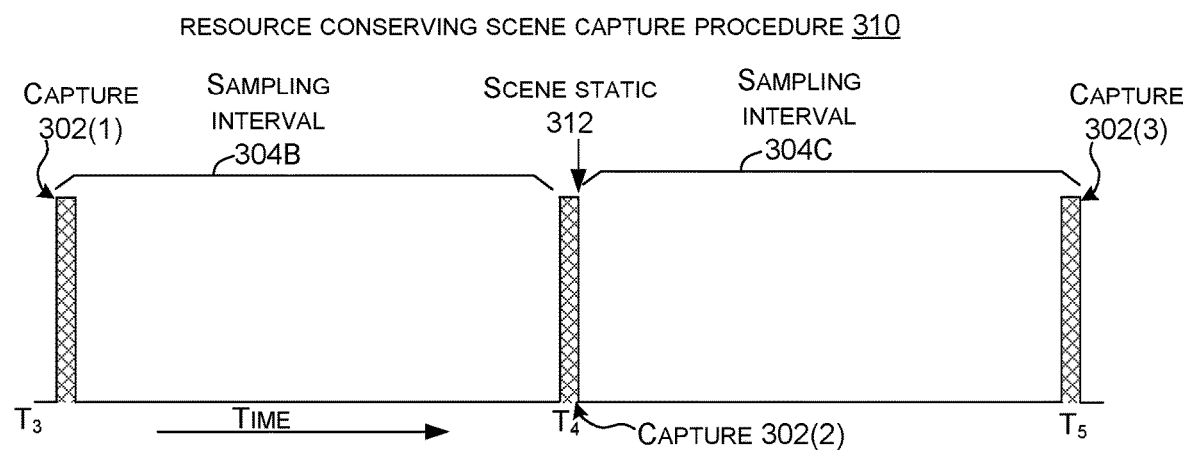
Figure 3C:
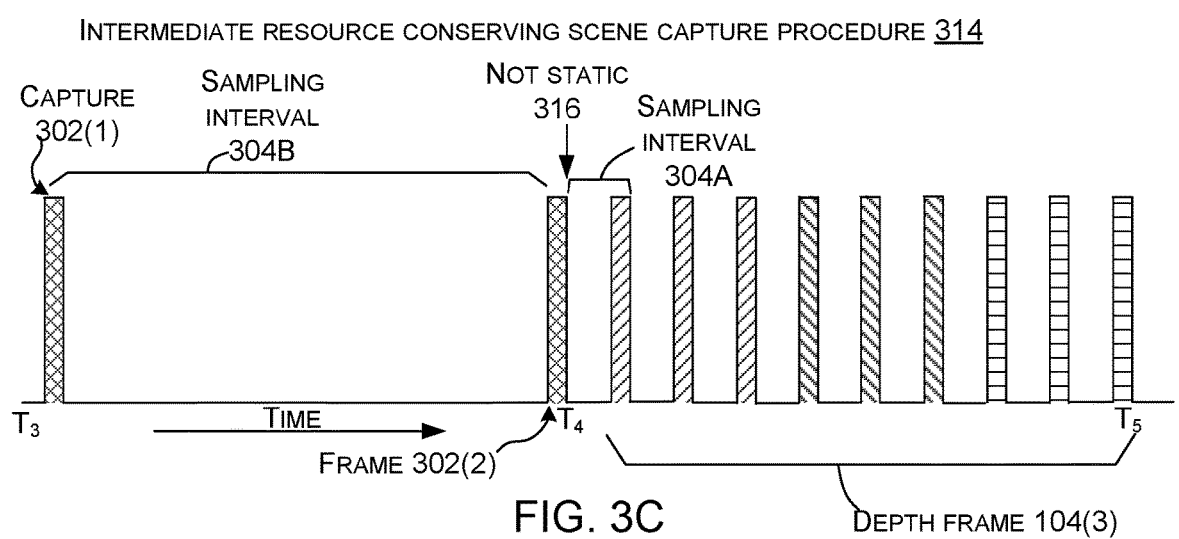

FIG. 1A shows scene 100. A surveillance device 102, that includes a depth camera 103 (facing away from the reader and thus the lens portion is not directly visible in this view) is positioned to capture the scene 100 (e.g., acquire information about the scene). FIG. 1B shows a frame (e.g., image) 104 of the scene 100 generated by depth camera 103. Briefly, the frame 104 can be generated from one or more captures or acquisitions of the scene 100 by the depth camera 103. For instance, a single capture can be used to generate a 2D black-and-white or color frame. In other cases, multiple captures may be processed to generate a 3D frame of the scene. Captures are discussed in more detail below relative to FIGS. 3A-3C. For ease of explanation, the discussion of introductory FIGS. 1A-1I is described relative to frame comparisons. As will be discussed relative to FIGS. 3A-3C, comparison of captures can provide useful information about the scene with low resource usage.

Note that depth cameras can also be capable of generating different types of frames, such as 2D frames, 3D frames, and/or frames of relatively higher and lower resolution and/or frames of different field of view, among others. The resource usage can vary with frame type. For instance, obtaining and comparing 3D frames can utilize more resources than obtaining and comparing 2D frames. Various types of depth cameras, such as time-of-flight depth cameras, structured light depth cameras, and/or stereo depth cameras can be employed.

Note that in this set of examples described in FIGS. 1A-1I, the term 'frame' 104 encompasses 3D frames and/or 2D frames as well as frames of different resolution (e.g., high resolution and low resolution), field of view and/or light types (e.g., visible light and/or IR light, among others). A depth frame or depth map can cover a field of view in the x and y reference directions and convey distances (in the z reference direction) to regions and/or objects of the frame. Frame differences will be discussed in more detail below relative to FIGS. 2 and 3A-3C.

Figure 1D:
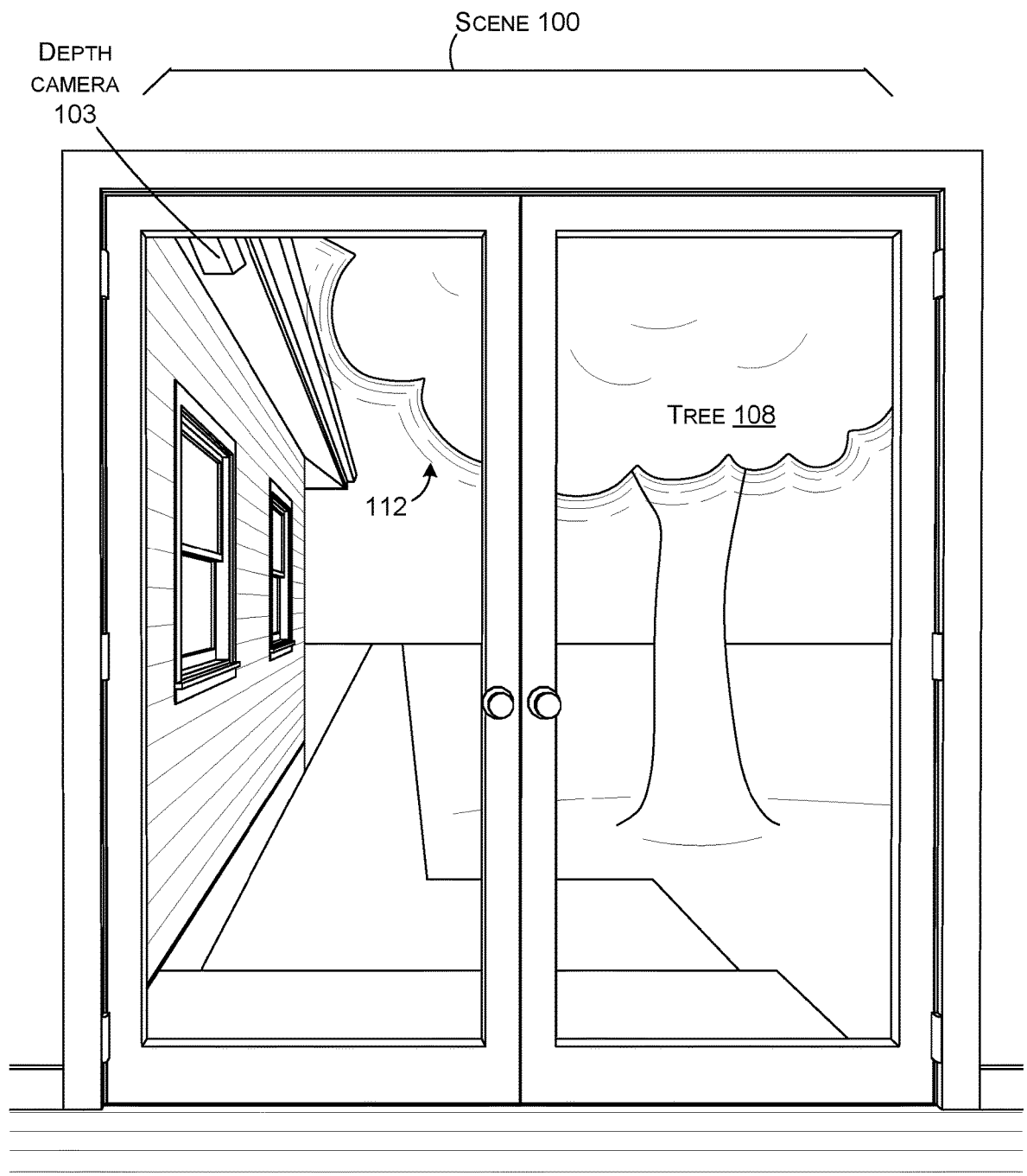
Figure 1E:
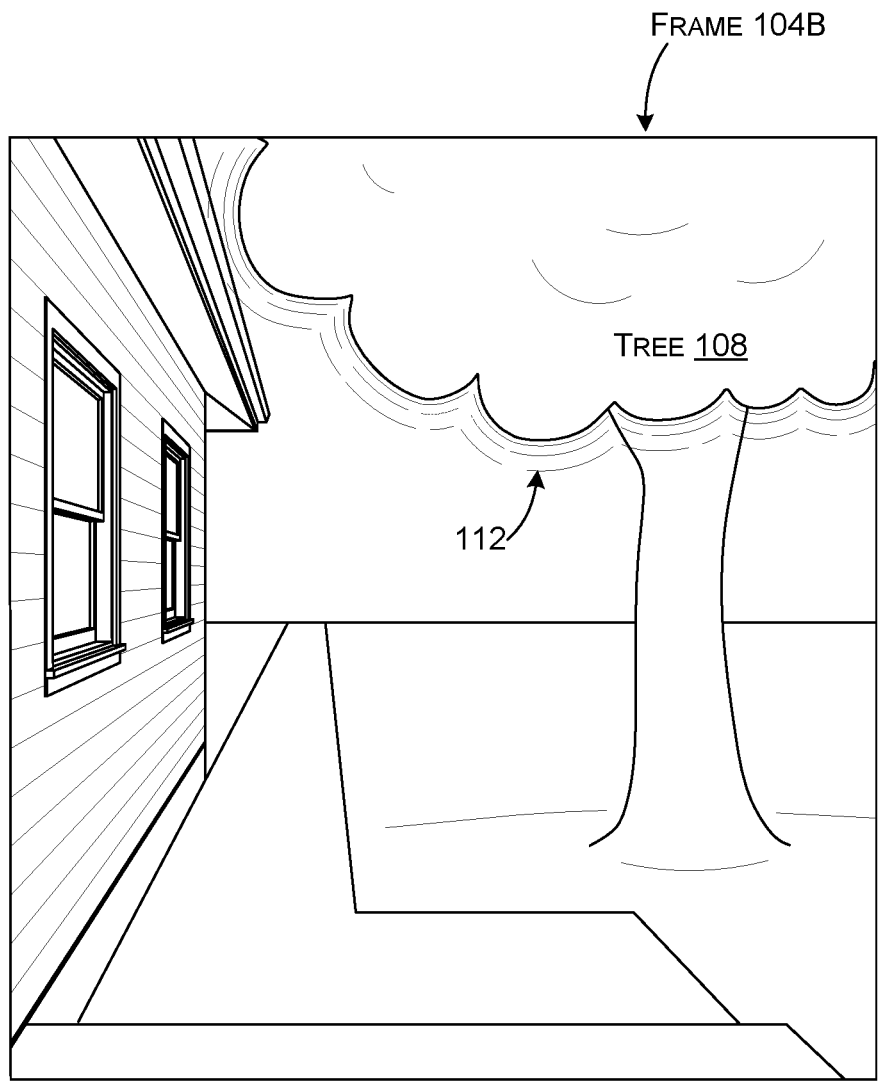
Figure 1F:
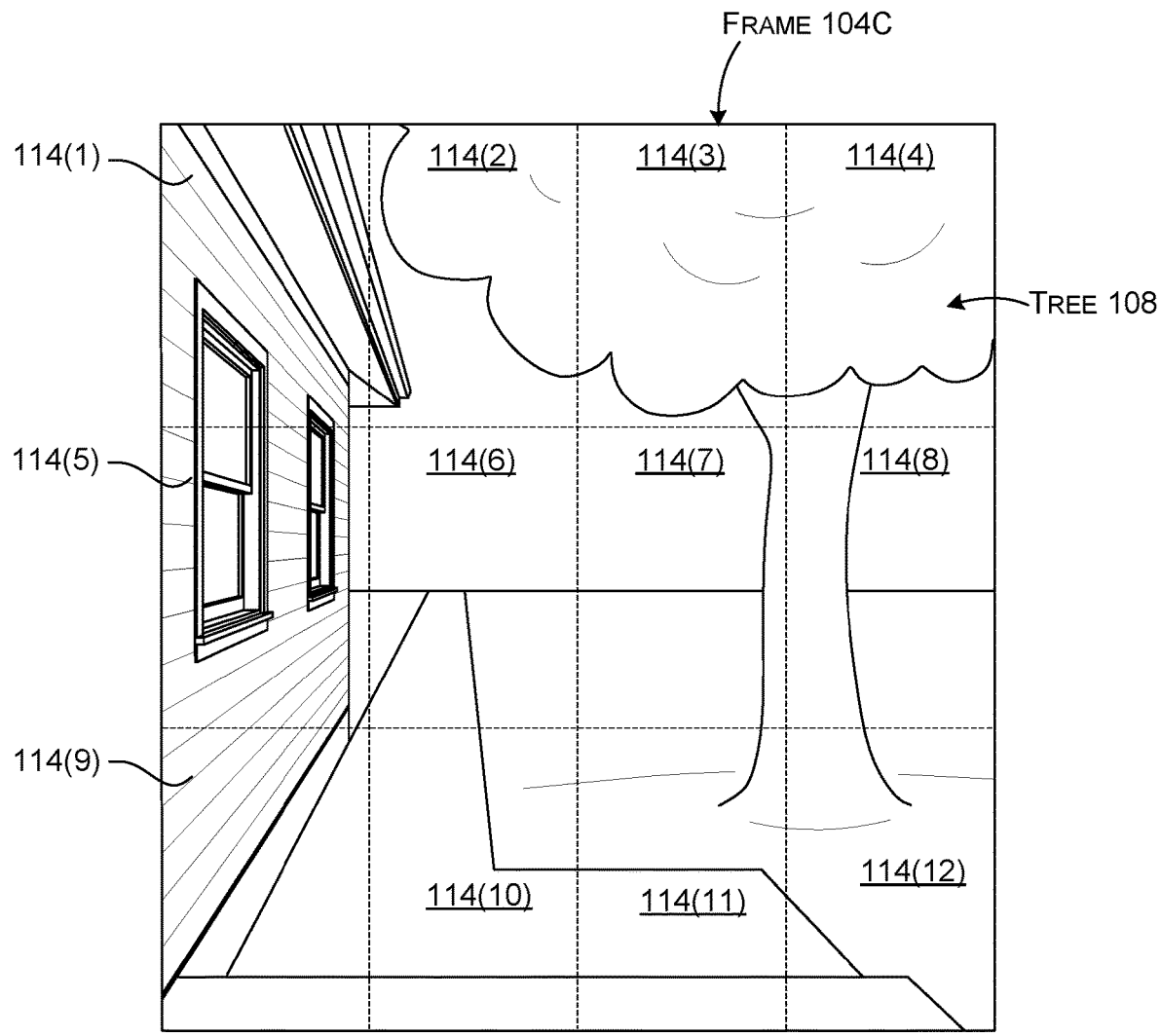
Figure 1G:
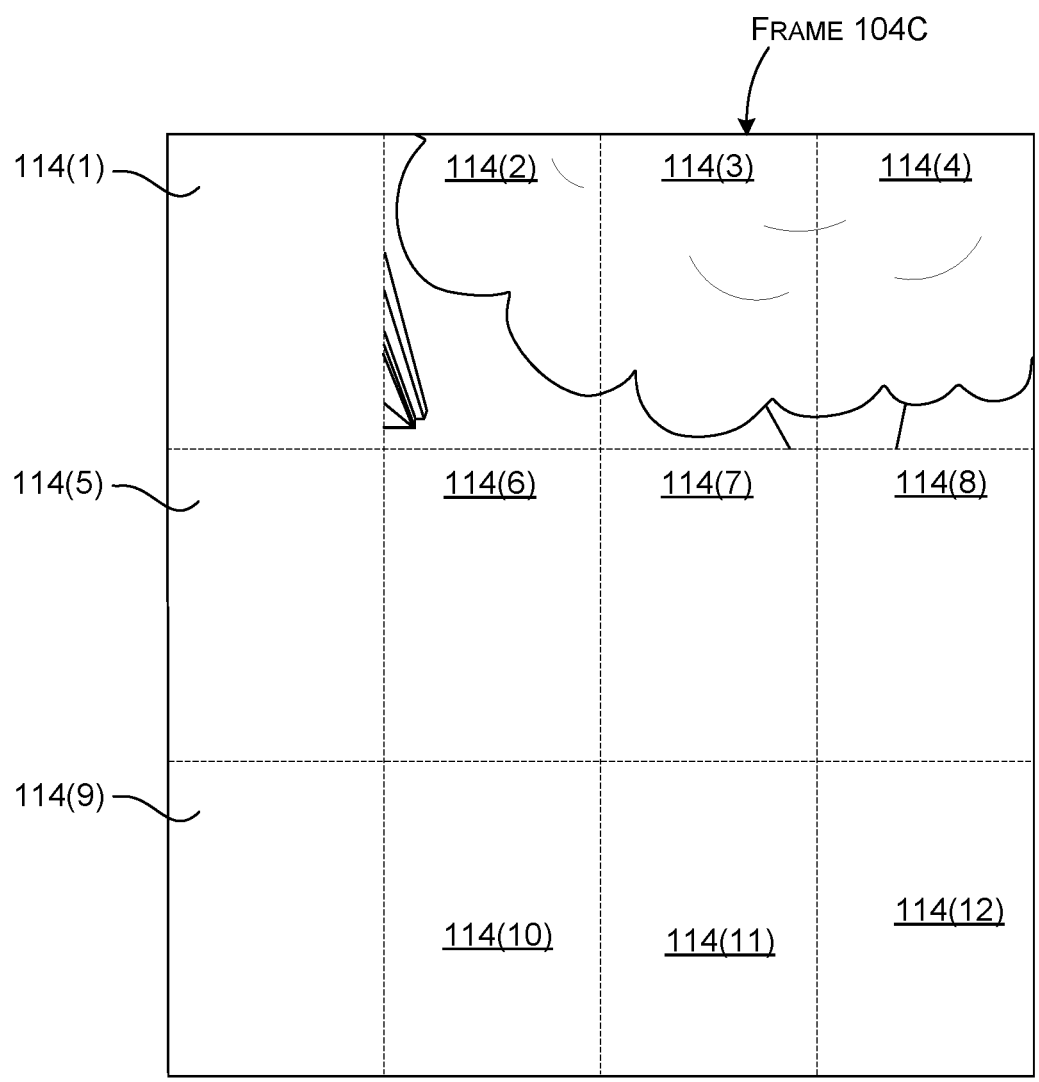
Figure 1H:
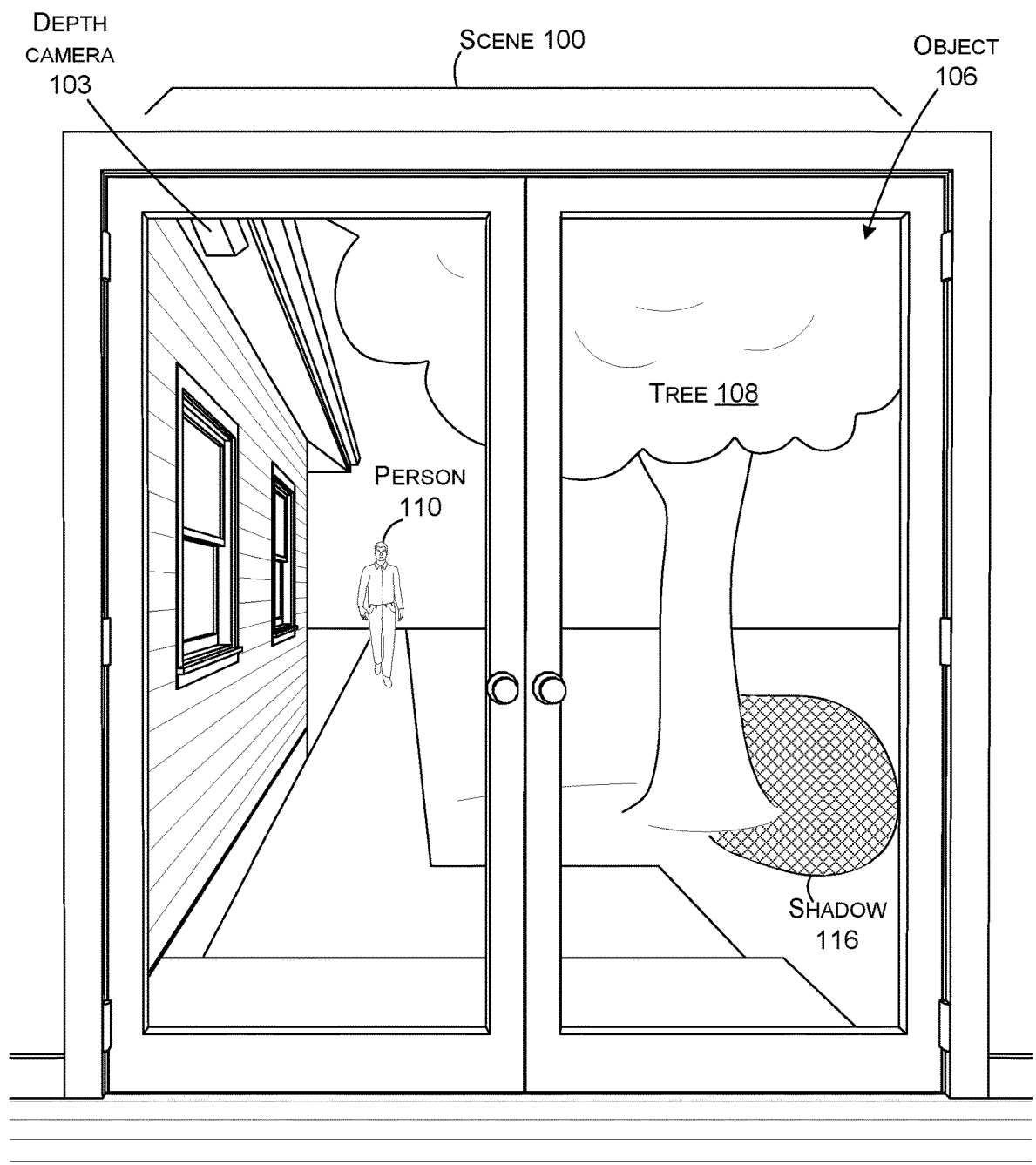

The scene 100 may contain various objects 106, such as a tree 108 and a person 110 (FIG. 1H). Objects may move, within the scene and/or may enter or leave the scene over time (e.g., scene is changing). However, most of the time the scene may be relatively static (e.g., unchanging). Thus, from one perspective, the term static can mean that the objects in a scene have not changed and the location of those objects in the scene has not changed. Note that some implementations may employ a minimum size to the objects, such that a butterfly flying through the scene is not identified as a change.

In general operation, depth cameras 103 tend to capture the scene multiple times per second. These captures are processed to produce a frame. This process utilizes substantial power and hardware resources. Yet, in many scenarios, depth information is redundant because the scene (or at least most of the scene) is static. Thus, when operated in this traditional manner, the depth camera tends to waste precious resources. The present implementations can offer a technical solution that can transition the depth camera to lower resource usage modes when the scene is static and transition to higher resource usage modes if something of interest (e.g., changes) to the scene are detected. Note that the present description refers to a first or high resource usage mode and a second or resource-conserving mode. Some implementations can employ this binary distinction. However, other implementations can employ a plurality of modes that are bounded by the highest resource usage mode on the upper end and the most resource-conserving mode on the lower end. In these latter implementations, resource usage can be specified as the lowest usage mode that provides determinative information about the scene. If determinative information is not obtained, the mode can be incrementally increased until a satisfactory determination is obtained.

The present implementations can employ several techniques in the lower resource usage modes. The techniques can relate to a set of frame acquisition parameters, which can include whether the scene is illuminated for the capture (e.g., passive versus active capture), how much of the scene is illuminated, how much of the scene is captured (e.g., image size), capture quality, capture sampling rate (e.g., the capture rate), and/or capture/frame analysis, among others. These aspects are now described by way of example relative to scene 100 and associated frames 104 produced by depth camera 103.

FIG. 1B shows frame 104. Assume for purposes of explanation that the depth camera 103 is operating according to a first or standard operating mode (e.g., according to a first set of frame acquisition parameters) to generate frame 104 of FIG. 1B and then frame 104A of FIG. 1C. In this case, both frame 104 and frame 104A can be high resolution depth maps generated from multiple scene captures. Assume further, that comparison of the frames 104 and 104A shows any differences between the frames to satisfy a static confidence threshold (e.g., high confidence that the scene is unchanged as determined by comparing the two frames). Stated another way, the comparison can determine with high confidence that nothing of interest happened in the scene between the two frames. Based upon the comparison, control of the depth camera 103 can be transitioned to a second or resource-conserving operational mode (e.g., according to a second set of frame acquisition parameters). For instance, one of the frame acquisition parameters can be sampling rate. In the first set of frame acquisition parameters, the sampling rate value could be 30 captures per second, for example. In the second set of frame acquisition parameters, the sampling rate could be one capture per second, for example. Assume for purposes of explanation that the camera operates for a period of time according to the second set of frame acquisition parameters until the wind starts to blow.

FIG. 1D shows scene 100 at a subsequent time. The wind is rustling the leaves of tree 108 as indicated at 112. FIG. 1E shows the corresponding frame 104B. This frame can be compared to other frames, such as the previous frame 104A (FIG. 1C) and/or additional frames acquired according to the second set of frame acquisition parameters. The comparison may indicate that the confidence that the scene is static is now low (e.g., does not satisfy the static confidence threshold). As one option, various actions can be taken to increase the confidence that a change occurred. For instance, an additional low-resolution frame (not shown) could be generated and compared to frame 104C to determine if a change occurred to the scene.

If this comparison is inconclusive, additional resources could be expended until a conclusive determination can be made about the status of the scene. For instance, if comparison of individual captures and/or frames acquired according to the second set of frame acquisition parameters is inconclusive, additional resource could be expended to obtain additional captures until a determinative comparison is obtained. Comparison of individual captures and/or frames can be inclusive about changes to the scene for various reasons. For example, when relying on ambient illumination of a scene for a capture, a change in the ambient light may cause differences in the two captures. However, these differences may not be determinative of changes to the scene (e.g., false positives). Instead, additional resources can be expended to obtain more determinative captures. For example, the scene could be actively illuminated for a pair of additional captures. Note that this active illumination can negate scene changes resulting from changes in the ambient light. If comparison of those captures is still inconclusive, additional resources could be utilized to obtain an additional depth frame of the scene or subset (e.g., region of interest of the scene). This depth frame could be compared to a previous depth frame (e.g., reference frame) and/or a second new depth frame to reach a conclusive determination.

Alternatively or additionally, some comparisons may not be determinative in that a change occurred to the scene, but comparison of the captures does not identify the change with high confidence (false negative). For example, comparison of captures may not determinatively detect a slow-moving object in the scene but may detect a region with more change than other regions (e.g., a region of interest). Additional resources can be dedicated to capturing this region of interest. Resource usage can be incrementally increased until a definitive determination can be made. Ultimately, an additional depth frame could be generated and compared (whole frame comparison or region of interest comparison) to a reference depth frame. Thus, instead of simply returning to standard operating parameters and capturing the whole scene multiple times to obtain the depth frames, the resource usage could be increased to a lesser amount by capturing only specific areas (e.g., region of interest) of the scene rather than the whole scene.

In some implementations, the frame comparison can be performed at a fine level of granularity. However, other implementations may employ resource-conserving techniques on the two frames before the comparison. Several examples of resource-conserving techniques are now described. One example resource-conserving technique can relate to conserving processing and hence power resources. Toward this end, pixels within the two frames (e.g., the current frame and a previous reference frame) may be grouped before comparison. For instance, groups of pixels, such as 3×3 or 5×5 adjacent pixels may be grouped and an average value generated for the group (e.g., binning). Corresponding groups of the two frames can then be compared with lower resource usage than comparisons on a pixel-by-pixel basis (e.g., lower analog-to-digital costs and/or processing costs). The binning may have additional advantages. For instance, in the case of fluttering leaves, some leaves may be fluttering forward and some backward at a given instance. Binning these pixels together can cancel out this movement and can show the tree has not actually moved (e.g., determine with high probability that the scene did not change).

Other implementations may detect a region of interest (in this case associated with the tree 108) where change may have occurred. A region of interest can be defined positively (e.g., a region of the frame where change occurred or may have occurred) and/or can be defined negatively (e.g., a region of the frame that is not determined with a high degree of confidence to be static). FIG. 1F shows the regions of interest as regions 114(2)-114(4) of frame 104C (e.g., the region of interest has an area less than the depth camera's entire field of view). These regions, could be analyzed with more resources than other regions of the frame (e.g., regions 114(1), 114(5)-114(12)). This heightened analysis for the regions of interest could be employed on this frame compared to the last frame and/or the next frame. This information regarding regions of interest can be further leveraged to accomplish further resource conservation. Conserving resources based upon regions of interest is described in more detail below relative to FIG. 4.

FIG. 1G shows a potential next example frame 104C sensed after a period of time, such as one second later. In this case, only the regions of interest (e.g., regions 114(2)-114 (4)) were sensed. Resources were not utilized to sense the remaining static regions. Alternatively, regions 114(2)-114 (4) could be sensed at a higher degree of resolution than the remaining regions (e.g., regions 114(1), 114(5)-114(12)). This 'probability focus' temporarily allows resources to be used where a change is mostly likely to occur in the scene 100. For instance, in the low resource usage condition where a frame is captured every second, a 'region of interest only frame' may be taken one second after the previous frame. If no change is detected in the regions of interest, other actions could be taken, such as taking and comparing region of interest only frames before switching to another full field of view frame after a period of time or if change is detected.

Figure 1I:
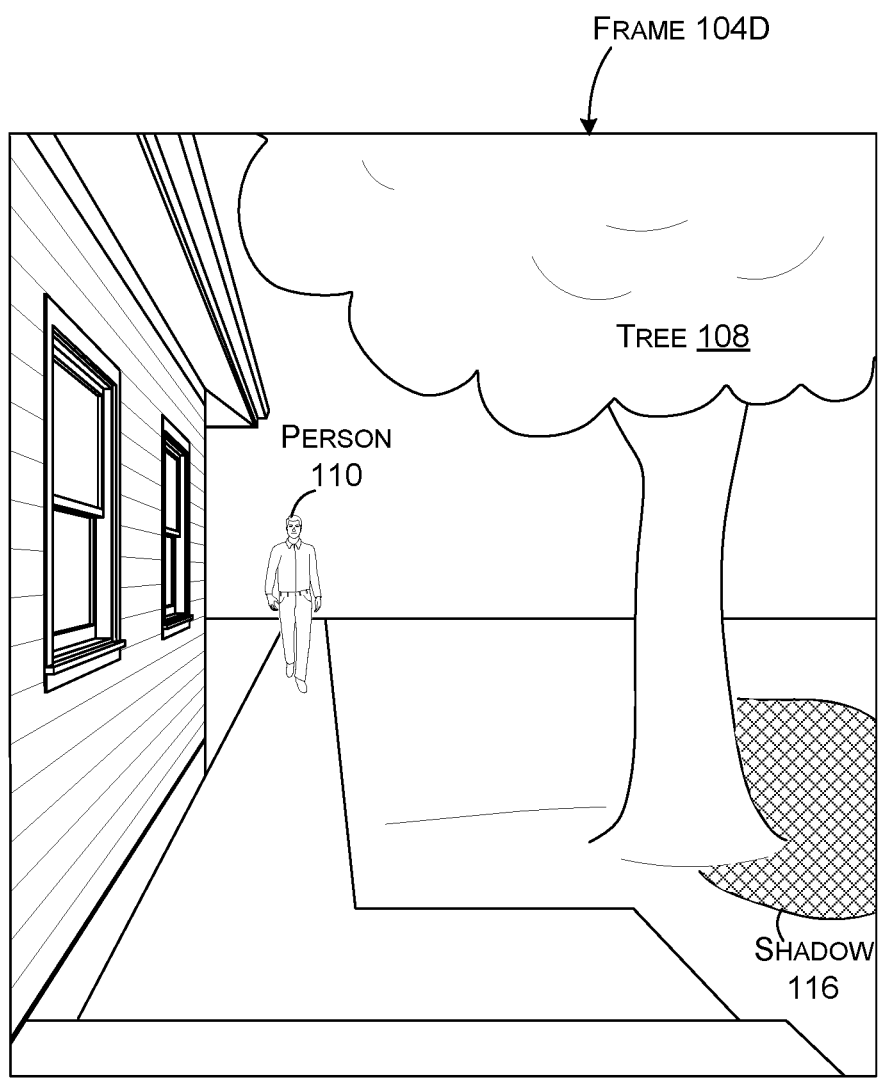

FIG. 1H shows scene 100 at a subsequent instance in time. FIG. 1I shows the corresponding frame 104D generated by the depth camera 103. At this point, two new 'objects' 106 are in the scene. The first object is person 110 and the second is a shadow 116 of tree 108. In this case, frame 104D may be a 2D frame. Both the person 110 and the shadow 116 may be tentatively identified as changes to the scene. However, the likelihood may not satisfy a threshold determination. For instance, differences between the frames may not satisfy the static confidence threshold, but may also be below a 'change' confidence threshold (e.g., analysis is inconclusive). In this implementation, an inconclusive analysis may trigger a tiered or incremental response. The tiered response may involve employing progressively more resources (e.g., progressively higher resource usage modes) until a conclusive determination can be made for each object of the scene. For instance, a depth frame or depth frames may be taken of the regions of interest occupied by the person 110 and the shadow 116. This depth frame of the regions of interest can be compared to the corresponding regions of the previous depth frame. Comparison of the depth frame can be conclusive (e.g., above the change confidence threshold or below the static confidence threshold). For instance, no matter how slowly the person moves, the depth frame can conclusively show different depths for the regions of interest in the presence of the user compared to the scene before the user. In the case of the shadow, the comparison of the depth frame can conclusively show that the depths have not changed and the shadow is not an actual object. As such, comparison of the depth frame can virtually eliminate both false positives and false negatives. Further, in this case these definitive analyses can be achieved with a tiered response, which in this case does not include capturing the whole scene and/or analyzing data of the whole scene (e.g., only the regions of interest).

The above discussion relates to controlling depth cameras utilizing techniques that offer the advantages of depth frames (e.g., fewer false positives and/or fewer false negatives), while using fewer resources. One technique can entail operating the depth camera in resource-conserving modes as long as the scene is unchanging (e.g., satisfies the static confidence threshold). If comparison of the scene is inconclusive (e.g., does not satisfy the static confidence threshold), then operation of the depth camera can entail progressively higher resource usage modes until a conclusive determination is achieved. For example, if the comparison fails the static confidence threshold, but is below the change confidence threshold (e.g., something of interest may or may not have occurred in the scene), some implementations can progressively employ more resources to the depth camera until a determinative conclusion can be reached. For instance, more resources can be utilized until either the static confidence threshold is satisfied (e.g., nothing of interest happened in the scene so no need to notify user) or the change confidence threshold is satisfied (e.g., something of interest did happen in the scene so notify the user). Other implementations may take other actions besides notifying the user.

Figure 2:
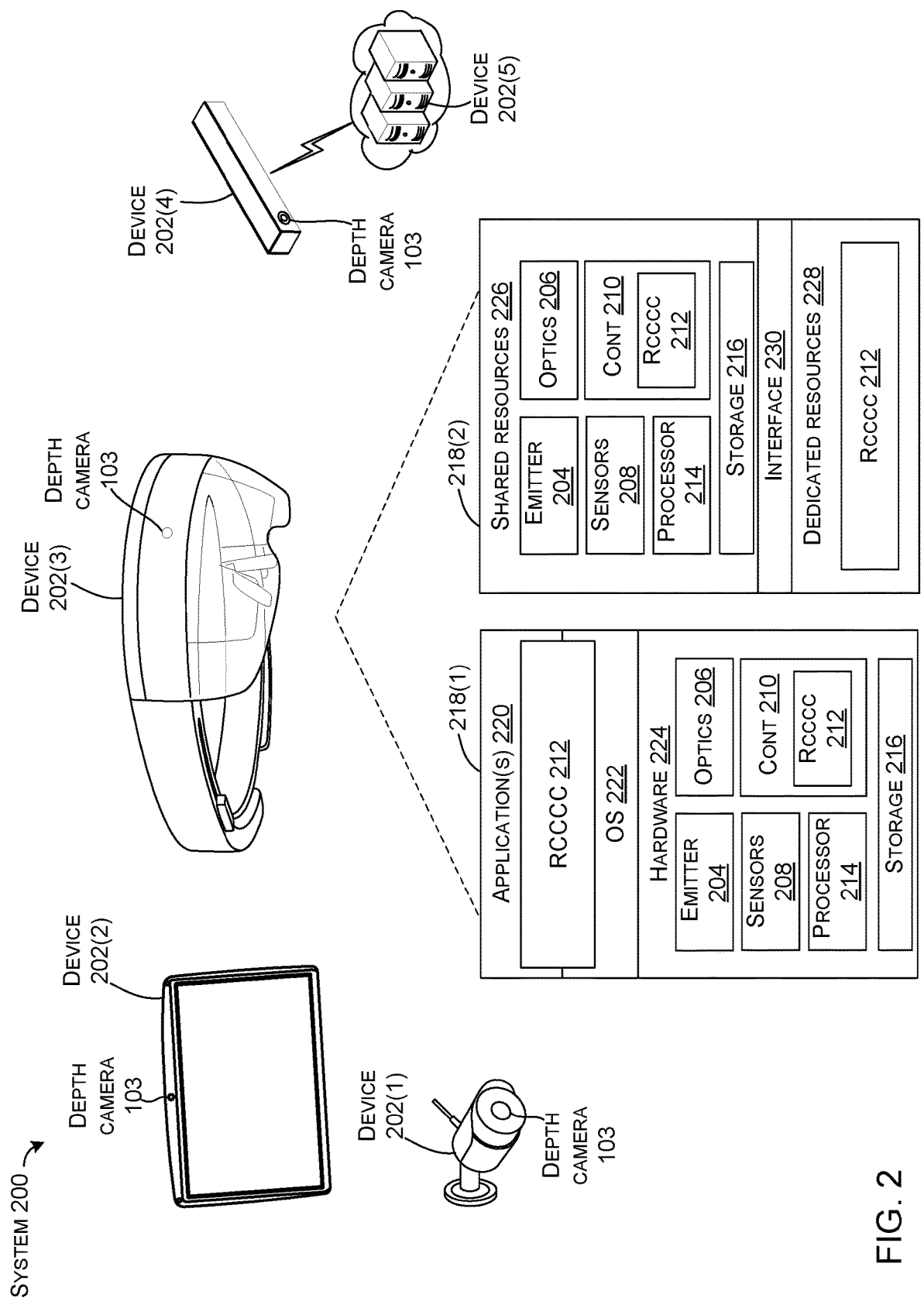
FIG. 2 shows an example system for accomplishing the present depth camera management concepts.

FIG. 2 shows a system 200 that can accomplish resource-conserving depth camera management concepts. For purposes of explanation, system 200 can include various devices 202(1), 202(2), 202(3), 202(4), and/or 202(5), among others. Device 202(1) is manifest as a surveillance device that is similar to surveillance device 102 of FIG. 1A. Device 202(2) is manifest as a tablet-type device. Device 202(3) is manifest as a head mounted augmented reality device, and device 202(4) is manifest as a depth sensing companion device for incorporation in a system that utilizes depth information, such as a gaming system. Any of these devices can be free-standing and/or can communicate with other devices, such as server-type devices 202(5). Individual devices 202 can include depth camera 103.

The depth camera can include an emitter 204, optics 206, a sensor 208, a controller 210, a resource-conserving camera control component 212, a processor 214, and/or storage 216. The resource-conserving camera control component 212 may be an aspect of the controller 210 and/or be independent of, but function in coordination with, the controller.

Emitter 204 can generate light to illuminate a scene and/or a subset of a scene (e.g., field of illumination (FOI)). The emitter 204 can include a light source, such as light emitting diodes (LEDs) or lasers. The light output of the emitter may be of fixed intensity or the intensity may be adjustable (e.g., dimmable). The emitter may include individually controllable light elements. For instance, the emitter may include a 10×10 array of LEDs, which may be controlled individually and/or in blocks or subsets to illuminate regions of interest of the scene. The light output (whether from all light elements or a subset thereof) can be focused, so that the field of illumination covered by the emitter covers the scene or a subset of the scene (e.g., actual FOI less than potential FOI). The emitter may also be steerable (in the x and y reference directions) so that the light from the emitter is directed to a region of interest in the scene.

Optics 206 may be used to focus light generated by the emitter and/or reflected from the scene. The optics can be configured to focus the returning light on the sensor 208.

Sensor 208 can be a photosensor, such as a charge coupled device (CCD) or complementary metal oxide semiconductor (CMOS). The sensor 208 can be manifest as an array of pixels that define a field of view (FOV) of the sensor. Individual portions of the sensor may be operated independently (e.g., a subset of the sensor can be used to capture a subset of the scene such that the actual FOV is smaller than the potential FOV). As with the emitter 204, the sensor 208 may be steerable to align the field of view with the scene and/or regions of interest of the scene. The sensor 208 can register or sense light received from the scene within the field of view. The sensor can register the light as analog values. An analog-to-digital converter (ADC) can convert the analog signals to digital signals for processing by controller 210.

The controller 210 can include a detector matrix and/or analog-to-digital converters. Controller 210 can control the emitter 204, optics 206, and/or sensor 208. Briefly, the controller 210 can control the emitter, optics, and/or sensors to capture the scene and generate frames, such as 2D and/or 3D frames. Many functions of the controller 210 can be universal across camera types. For instance, the controller can cause captures to be obtained passively and/or actively. In passive mode, the controller does not activate the emitter 204 and the sensors 208 capture ambient light reflected from the scene.

Other functions of the controller 210 can be specific to 3D camera type. For instance, for a patterned light depth camera, the controller can cause patterned light to be projected on the scene from the emitter. The reflected light captured by the sensor can be analyzed to determine depths of the scene. For a time-of-flight depth camera, the controller can cause a series of light emissions at different frequencies. Time-of-flight cameras tend to be 'gated' time-of-flight cameras or 'continuous wave' time-of-flight cameras. The sensor captures the reflections and the distances are determined based upon the travel times of the reflected light. Thus, the 3D frame (e.g., a depth map) can be generated from a series of multiple captures taken in quick succession at multiple frequencies. This aspect is discussed more below relative to FIGS. 3A-3C.

In active mode, the controller can cause the emitter 204 to emit pulses of light of specific frequencies for a specified duration of time. The controller can cause the sensors 208 to capture (e.g., accumulate) photocharge from the reflected light. The controller can include a detector matrix and ADCs and can analyze the sensed light and emitted light to determine the depth for pixels of the sensors (e.g., generate the depth frame from multiple captures). Thus, in the active mode there tends to be three substantial areas that energy is used to generate a depth frame. The first area of energy usage is powering the emitter to illuminate the scene (not a consideration in passive mode). The second area involves powering the sensor to capture the reflected light. The third involves processing the emitted and sensed light with the detector matrix and analog-to-digital converters. This last process also utilizes processing resources and therefore these processing resources may be temporarily unavailable for other functions.

The resource-conserving camera control component 212 can cause the controller 210 to operate in a resource-conserving manner while still providing useful information about the scene. For instance, the resource-conserving camera control component 212 can compare individual captures and/or frames of the scene. If the comparison indicates that the scene is not changing (e.g., satisfies the static confidence threshold), the resource-conserving camera control component can reduce one or more of capture rate (e.g., sampling rate), captured region, illumination intensity, etc. to conserve resources. The resource-conserving camera control component 212 can analyze captures and/or frames during this resource-conserving mode. If the resource-conserving camera control component detects potential changes to the scene, it can increase resource usage until it can make a conclusive determination about the potential changes. The resource-conserving camera control component can then cause an appropriate action to be taken, such as storing the captures/frames and/or sending a notification to a user. The resource-conserving camera control component can continue to operate the camera in lowest resource usage modes (e.g., highly resource-conserving modes) that provide determinative information about the scene. In the event that determinative information cannot be obtained, the resource-conserving camera control component can incrementally increase the resource usage modes until determinative information can be obtained.

The resource-conserving camera control component 212 can manage whether to employ passive illumination or actively illuminate the scene with the emitter 204. Even with active illumination, resource-conserving camera control component 212 can conserve resources. For instance, in some cases the resource-conserving camera control component 212 can cause the emitter to emit light at 100% of its potential intensity. The resource-conserving camera control component 212 could then cause the optics to focus the light over the entire scene and cause all sensors of the array to accumulate photocharge from the scene. The resource-conserving camera control component 212 can analyze the results and make a determination whether the scene warrants such illumination levels (e.g., satisfies static confidence threshold). For instance, the resource-conserving camera control component 212 could temporarily cause the emitter to emit at 10% and cause the optics to focus the light over the entire scene to be accumulated by all of the sensors. This may provide enough information to continue to determine a static confidence value.

As long as the determined static confidence value satisfies the static confidence threshold, the resource-conserving camera control component 212 can continue the operation in resource-conserving modes. Alternatively, upon determining that most of the scene is unchanged and only a region of interest is potentially changing, the resource-conserving camera control component 212 could cause the emitter to emit at 10% and cause the optics to focus the light at the specific region of interest in the scene and further power on only a subset of the sensors corresponding to the region of interest to accumulate photocharge. These types of resource-conserving techniques could be continued unless the resource-conserving camera control component 212 determines that the information obtained is not determinative of whether the scene is unchanged or whether change is occurring (e.g., not accurate enough) or determines that a potential change has occurred to the scene. In these cases, the resource-conserving camera control component 212 can increase resource usage to capture the scene, either by immediately operating in the standard mode, or in a tiered fashion that can stop progressing when determinative information is obtained.

FIG. 2 shows two device configurations 218 that can be employed by devices 202. Individual devices 202 can employ either of configurations 218(1) or 218(2), or an alternate configuration. (Due to space constraints on the drawing page, one instance of each device configuration is illustrated rather than illustrating the device configurations relative to each device 202). Briefly, device configuration 218(1) represents an operating system (OS) centric configuration. Device configuration 218(2) represents a system on a chip (SOC) configuration. Device configuration 218(1) is organized into one or more applications 220, operating system 222, and hardware 224. Device configuration 218(2) is organized into shared resources 226, dedicated resources 228, and an interface 230 therebetween.

In configuration 218(1), the resource-conserving camera control component 212 can be manifest as part of the controller 210. Alternatively, the resource-conserving camera control component 212 can be manifest as an application that operates in conjunction with the controller to control the depth camera 103. In configuration 218(2), the resource-conserving camera control component 212 can be manifest as part of the controller 210 or a dedicated resource that operates cooperatively with the controller.

In some configurations, each of devices 202 can have an instance of the resource-conserving camera control component 212. However, the functionalities that can be performed by resource-conserving camera control component 212 may be the same or they may be different from one another. For instance, in some cases, each device's resource-conserving camera control component 212 can be robust and provide all of the functionality described above and below (e.g., a device-centric implementation). In other cases, some devices can employ a less robust instance of the resource-conserving camera control component 212 that relies on some functionality to be performed by another device. For instance, device 202(5) may have more processing resources than device 202(4). In such a configuration, some resource-conserving camera control functions may be performed on device 202(5) for controlling depth camera 103 on device 202(4).

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

As mentioned above, device configuration 218(2) can be thought of as a system on a chip (SOC) type design. In such a case, functionality provided by the device can be integrated on a single SOC or multiple coupled SOCs. One or more processors 214 can be configured to coordinate with shared resources 226, such as memory/storage 216, etc., and/or one or more dedicated resources 228, such as hardware blocks configured to perform certain specific functionality. Thus, the term "processor" as used herein can also refer to central processing units (CPUs), graphical processing units (GPUs), field programmable gate arrays (FPGAs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Figure 4:
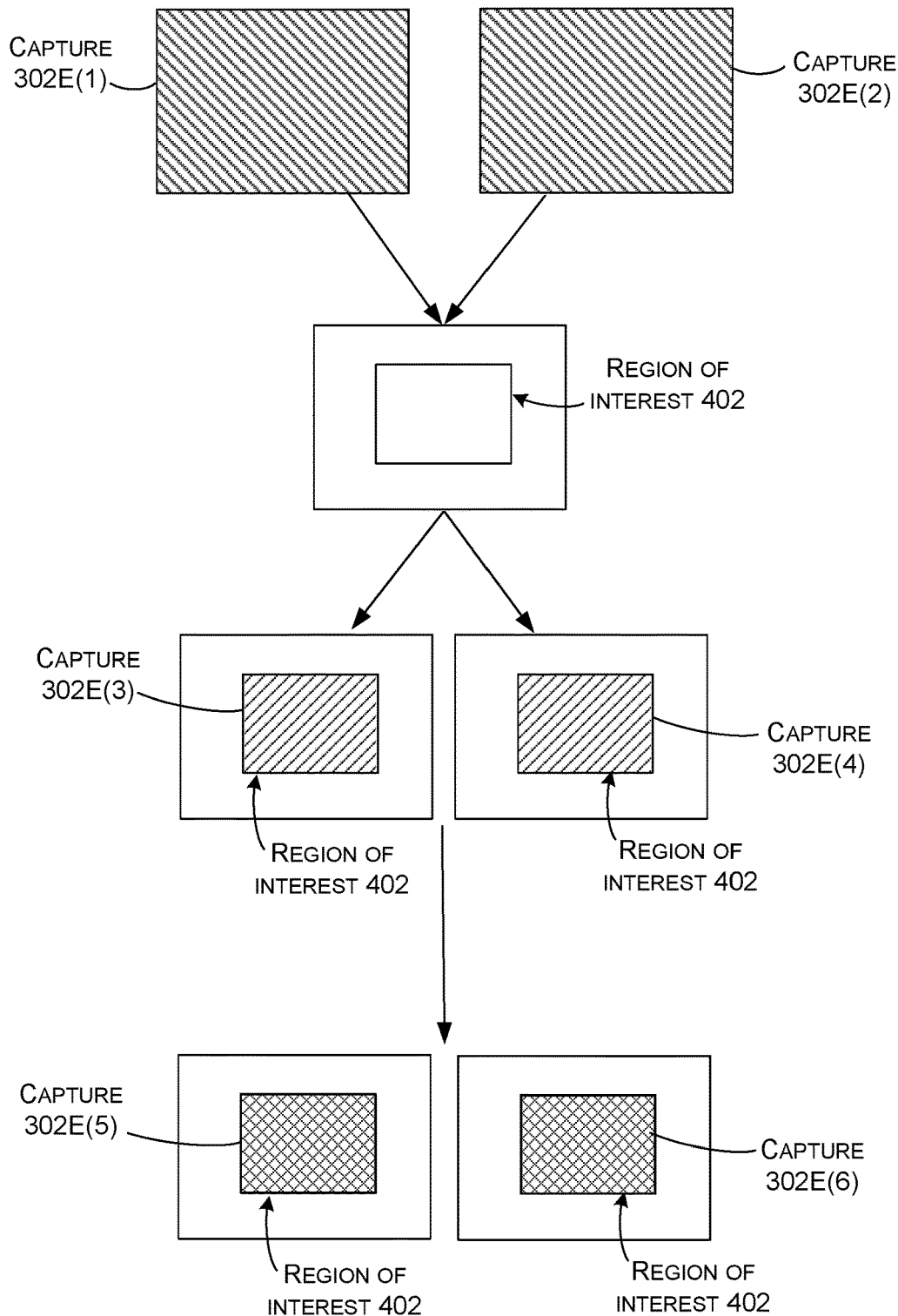

FIGS. 3A-3C and 4 offer additional details about some of the resource-conserving techniques introduced above relative to FIGS. 1A-1I. FIGS. 3A-3C relate to frame acquisition rate. FIG. 4 relates to targeted imaging (e.g., imaging a subset, such as a region of interest, of the scene rather than the entirety of the scene). These details are explained in the context of a continuous wave time-of-flight (CW-TOF) depth camera, but can be applicable to other depth camera types.

FIG. 3A shows an example higher resource usage scene capture procedure 300. Captures 302 are represented graphically by peaks. Note that each capture 302 can be utilized alone or in combination with other captures to generate a frame 104 of the scene. Captures 302 are sampled according to a sampling interval 304A. In this example, frame 104(1) is a depth frame. Frame 104(1) can be generated by repeatedly capturing (e.g., projecting and acquiring) three different frequencies of light in succession from time zero ($T_0$) to time one ($T_1$). In this case, nine captures occur between time $T_0$ and time $T_1$. (In FIG. 3A, different crosshatching patterns represent different frequencies of light). Often these frequencies are in the IR band so they are not discernable to humans. This process can be repeated from Time $T_1$ to time $T_2$ to obtain nine additional captures. Frame 104(2) can be generated from these additional captures. Note that the individual captures 302 can include information about the scene, but potentially less information than the resultant depth frames 104(1) and 104(2).

In this case, each frequency is sampled three times, for example, to produce three captures 302 before progressing to the next frequency. (Not all of the captures 302 are designated with specificity). In this example, three captures 302 at three different frequencies (for a total of nine captures) contribute to an individual depth frame 104(1) and 104(2). Traditionally, the process is repeated multiple times per second, such as 30 times per second, for example. (Note that specific values are provided relative to this example for purposes of explanation. The concepts can be applied to other values). Assume that comparison of depth frames 104(1) and 104(2) indicate that the scene captured by the depth frame is unchanging (e.g., static confidence value satisfies static confidence threshold). Based at least in part upon this comparison, fame acquisition can be transitioned to a resource-conserving mode in FIG. 3B.

FIG. 3B shows resource-conserving scene capture procedure 310 starting at time $T_3$ which is subsequent to time $T_2$ of FIG. 3A. Captures 302 are sampled at a resource-conserving sampling interval 304B that is much longer than sampling interval 304A of FIG. 3A. Stated another way, sampling is now occurring less frequently than in the standard scene capture procedure 300 of FIG. 3A. In this example, sampling interval 304B can be about one second, for instance. The captures 302 may be sampled at one of the frequencies of light used above in FIG. 3A or a different frequency, such as an IR frequency or a visible light frequency. The captures may be passively sampled utilizing a frequency or frequencies of ambient light available at the scene. If adequate ambient light is not available (or becomes unavailable, such as after sunset) the scene may be illuminated for the purposes of capturing the scene.

At time $T_3$, capture 302(1) is obtained. At the end of sampling interval 304B, at time $T_4$ capture 302(2) is obtained. These captures 302(1) and 302(2) can be compared to determine if the scene remains unchanged. In this case, assume that the likelihood that the scene is unchanged (e.g., static confidence value satisfies static confidence threshold as indicated at 312). As such, the resource-conserving sampling interval is maintained as evidenced by sampling interval 304C equaling sampling interval 304B. At time $T_5$ capture 302(3) can be obtained. Capture 302(3) can be compared to capture 302(2) to evaluate the scene. This resource-conserving scene capture procedure 310 may be repeated as long as the scene remains unchanged (e.g., a static condition indicates that no change of interest is occurring in the scene). Thus, in the resource-conserving scene capture procedure 310 less resources are expended to obtain captures per unit time compared to the standard capture acquisition procedure 300 of FIG. 3A. Further, comparison of two captures in the resource-conserving scene capture procedure 310 can utilize fewer resources than comparison of frames 104(1) and 104(2) in FIG. 3A.

FIG. 3C shows intermediate resource-conserving scene capture procedure 314. FIG. 3C begins identically to FIG. 3B. However, in this case, comparison of capture 302(2) to capture 302(1) does not determinatively indicate that the scene remains unchanged at 316 and thus the scene may have changed or may not have changed. Stated another way, the comparison may indicate that the confidence that the scene is unchanged is not high enough to satisfy the static confidence threshold and thus more sampling is warranted to make a conclusion one way or another. As such, after time $T_4$, FIG. 3C transitions to a higher sampling interval 304A similar to FIG. 3A between time $T_4$ and $T_5$. As mentioned, this transition to a shorter sampling interval can be resource-conserving. For example, the captures of FIG. 3C can be limited to region of interests (e.g., regions with inconclusive comparison) rather than the capturing the whole scene (e.g., the full field of view). If a conclusive determination can be made from these captures, then resource usage can be lowered, otherwise resource usage can be incrementally increased until a conclusive determination can be made.

The discussion above indicates that the resource-conserving scene capture procedure 310 and the transition scene capture procedure 314 may employ passive acquisition, active acquisition, and/or a combination thereof. Passive acquisition can reduce/minimize the power consumption during resource-conserving modes, operating the system as a passive imager. For instance, lasers and clocks modulating the voltage applied to the polysilicon gates of the hardware in the sensors can be turned off. One consideration of passive imaging is that changes in ambient light can be interpreted as scene changes. This aspect can be reduced by periodically capturing new frames and replacing the previous reference frame with the new frame. As such, ambient light changes between consecutive frames are less significant than those separated by large amounts of time. Active capture can be utilized when adequate ambient light is not available and/or when the ambient light does not provide definitive information about the state of the scene.

Active capture can rely on the differential pixel feature that can reduce/minimize the effect of the ambient light. In this case, in some of the resource-conserving modes, even when active illumination is employed, the sampling interval can be much lower than standard frame acquisition rates. Further, the light frequency with which the scene is illuminated can be selected for high and potentially maximum signal to noise ratio.

Independently of collecting passive or active captures, during the resource-conserving modes, full field of view captures can be obtained to increase the probability of detecting an event of interest in the field of view. However, pixel binning can be used during array read-out. Binning can increase signal-to-noise ratio (due to reduced read noise) at the expense of reduced spatial resolution, which can be valuable for reducing power consumption during resource-conserving modes. It can be performed in pixel groups from 2×2 up to the array size. The pixel group size can provide a trade-off between the spatial resolution and the power consumption. In digitally binned resource-conserving modes, ADC resolution (per pixel) may be reduced. Once the chip exits the resource-conserving modes upon detection of a difference from a reference frame, the chip can be reconfigured for un-binned read-out in full spatial resolution. Alternately the chip may be woken up hierarchically with progressively lower levels of binning applied to the areas where activity is detected (e.g., incrementally more resource usage). Resources can still be saved by targeting regions of interest rather than the whole scene (e.g., the whole field of view).

Note also, that the extent of the binning may be decreased if determinative comparisons are not achieved. For instance, one resource-conserving mode may employ extensive binning, such as 6×6 pixels. If comparison of the binned captures/frames is inconclusive, the next highest resource-conserving mode may bin on a 3×3 basis, for example. If this mode proves inconclusive the next resource-conserving mode may eliminate binning altogether, for example.

Region of interest operation can allow imaging and reading only part of the chip, effectively reducing the number of ADC's in use, and therefore, the power usage of the chip. Using the region of interest operation, for the same laser peak power, some implementations can reduce the integration time (thanks to narrower field-of-illumination), thus improving the ambient resiliency. Alternatively, some implementations can keep the integration time the same, and reduce the laser peak power. This latter configuration can reduce laser power consumption at the cost of reduced ambient resiliency.

FIG. 4 shows resource-conserving operation 400 of a depth camera associated with captures 302E. While operating in resource-conserving modes, two captures 302E(1) and 302E(2) can be obtained. In captures 302E(1) and 302E(2) the field of illumination and the field of view are generally equal and aligned. For purposes of explanation, comparison of these two captures might indicate that a change may have occurred in a region of interest 402 (e.g., static confidence value for region of interest below static confidence threshold). (The region of interest 402 is similar to the regions of interest 114(2)-114(4) discussed above relative to FIG. 1F). In a tiered response, two subsequent consecutive captures 302E(3) and 302E(4) can be obtained of the region of interest 402 (e.g., a remainder of scene is not illuminated, sensed, and/or processed). In this case, captures 302E(3) and 302E(4) can be relatively low-resolution. In this example, comparison of captures 302E(3) and 302E(4) is inconclusive (e.g., does not determinatively show that the scene is unchanging or changing). As such, additional captures 302E(5) and 302E(6) can be obtained. These captures are higher resolution than captures 302E(1) and 302E(2) but are only imaged at the region of interest 402 to conserve resources.

If comparison of captures 302E(5) and 302E(6) is determinative, a corresponding action can be taken. For instance, if the comparison indicates that the scene changed, a notification can be sent to a user. If the scene did not change, operation of the depth camera can be returned to a lower resource-conserving mode (or incremented lower). If the comparison is not determinative, additional resources can be employed until a determination can be made with high confidence whether something of interest happed in the scene or not.

Figure 5:
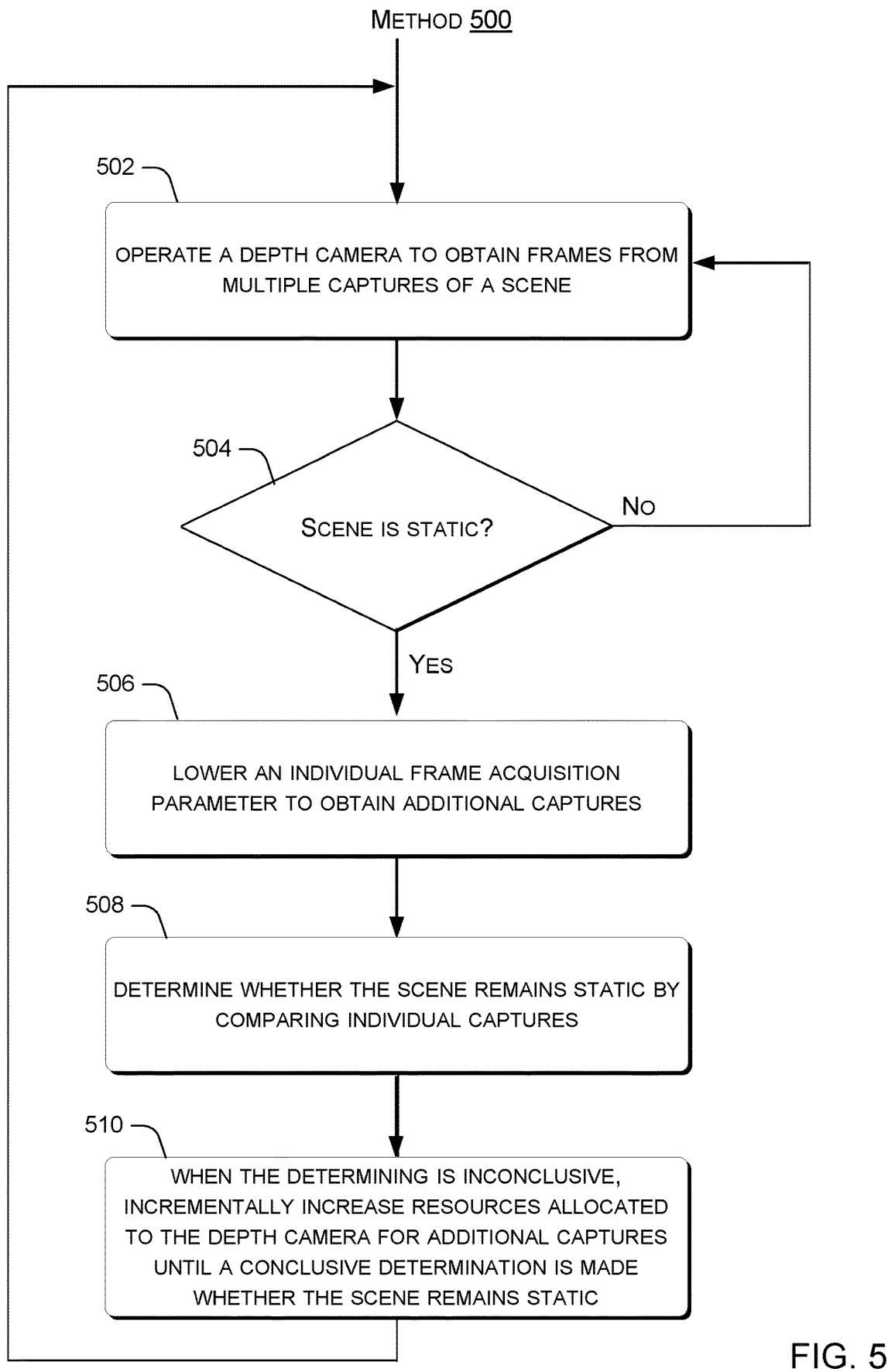
FIGS. 5 and 6 show example flowcharts for accomplishing resource-conserving depth camera management concepts in accordance with some implementations.

FIG. 5 shows a resource-conserving depth camera management method or technique 500. Block 502 can operate a depth camera to obtain frames from multiple captures of a scene. For instance, the frames can be depth frames that are generated from multiple captures. One such configuration is described above relative to FIG. 3A.

Block 504 can compare a first frame of the scene to a second frame of the scene to determine whether the scene is static. Comparing the frames can identify differences between the frames. In the case of depth frames, the differences can be indicative of physical changes to the scene (e.g., an object moving).

If the scene is static (e.g., yes at 504), block 506 can lower an individual frame acquisition parameter to obtain additional captures. Stated another way, the method can transition from the standard mode to one of the resource-conserving modes. In some cases, a single frame acquisition parameter, such as sampling interval 304 of FIGS. 3A-3C, can be changed. In other cases, multiple frame acquisition parameters can be changed. For instance, active illumination could be changed to passive, the sampling interval could be changed, and/or the area of the scene captured (e.g., whole scene versus region of interest) can be changed, for example.

Block 508 can determine whether the scene remains static by comparing individual captures. This comparison can utilize the same static confidence threshold and/or change confidence threshold described above. Alternatively, different tests can be employed. In one such example, the individual captures may be obtained with ambient lighting. In such a case, differences between the captures may be caused by a physical change to the scene or an ambient lighting change to the scene. A determination about the scene based solely on this comparison may not be reliable (e.g., not satisfy the confidence threshold), but may identify regions of interest (e.g., areas with more change).

When the determining is inconclusive, block 510 can incrementally increase resources allocated to the depth camera for additional captures until a conclusive determination is made whether the scene remains static. Continuing with the example above, the comparison of the passive captures may not be conclusive. In such a case, additional resources can be employed to illuminate the scene for additional captures. The activation may utilize more resources, but this increase can be reduced by decreasing the amount of the scene that is illuminated (e.g., only illuminating regions that were different). The comparison of the actively illuminated frames can obviate ambient lighting factors and thus more definitively determine whether the scene physically changed. Some implementations can determine if the scene is static by comparing differences between the two frames to a static confidence threshold. For instance, the static confidence threshold may be set such that no group of 'x' number of adjacent pixels, such as 100 adjacent pixels, experienced more than a change of 'y' percent, such as 5%. Changes to pixels below the number x (e.g., individual pixels or a few pixels) can be treated as superfluous and ignored. This facet can address both noise and small objects such as butterflies that are deemed to be 'uninteresting.' This facet can avoid false positives. (The size of the pixels can be adjusted to achieve a desired sensitivity to change). If the comparison satisfies the static confidence threshold (e.g., static confidence value below the static confidence threshold), then the scene can be treated as static.

Alternatively or additionally, some implementations can employ a change confidence threshold. For example, the change confidence threshold may be set at whether a group of 's' number of adjacent pixels, such as 1000 adjacent pixels, experienced more than a change of 't' percent, such as 10%. If the comparison satisfies the change confidence threshold then the scene is determined conclusively to have changed. In such a case, various actions can be taken, such as notifying a user. In some cases, the comparison will not satisfy the static confidence threshold or the change confidence threshold (e.g., comparison inconclusive). In such cases, the tiered response approach can gradually employ more resources until a conclusive determination can be made one way or another.

Figure 6:
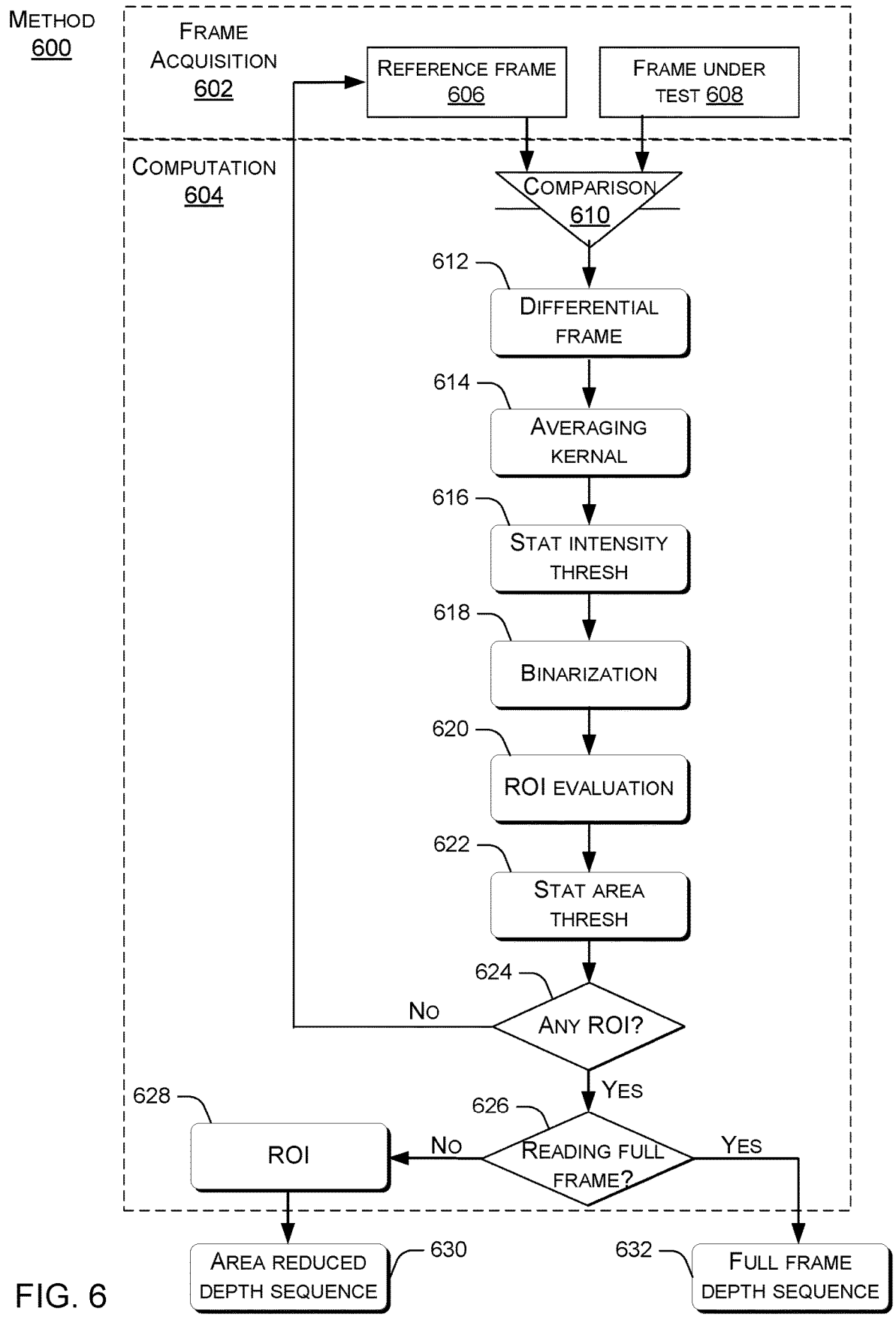

FIG. 6 shows a resource-conserving depth camera management method or technique 600. For purposes of explanation, the method is explained relative to actions associated with frame acquisition at 602 and actions associated with computation at 604.

Frame acquisition 602 can involve a reference frame 606 and a frame under test 608. In some cases, these frames could be the current frame and a previous frame.

Computation 604 can compare the frames 606 and 608 at 610. The comparison can detect similarities and/or differences between the two frames. In some cases, the comparison can entail subtracting the frame under test 608 from the reference frame 606 to identify the differences (e.g., differential frame 612).

An averaging kernel can be employed at 614. For instance, pixel differences between the frames may or may not be indicative of a change. For example, the amount of noise can be different for the two frames. The property of random white noise can be considered. The noise generated by the pixels, spatially or temporally, even though uncorrelated can create the same statistics for similar signal to noise ratios. Therefore, if a mean kernel, even covering a small number of pixels, such as 3×3, or 5×5 for example, is applied the result is a number very close to 0, in the case of a static scene. However, when a change in the geometry of the scene is produced the result changes.

Statistical intensity thresholding can be employed at 616. In one implementation, the Otsu method can be employed using only two classes of background with a variance; the signal variance with a non-zero mean and a broader variance.

Binarization can be employed at 618. The binarization can use the variance of the background class to assign 0 and 1 for the values over the variance.

Region of interest evaluation can be employed at 620. For instance, using connected components (e.g., a morphological operator) can provide the area and positions of clusters of points in a binary image that may be regions of interest.

Statistical area thresholding can be employed at 622. For instance, as mentioned above relative to FIG. 5, small areas (e.g., small numbers of pixels) can be treated as random noise and as such do not receive further evaluation. However, areas over an amount (for instance over 100 adjacent pixels) can be considered as candidate regions of interest.

Region of interest evaluation can be performed at 624 on those areas that satisfy the thresholding of block 622. Connected components can function as a morphological operator that can provide the area and positions of clusters of points (e.g., groups of adjacent pixels of a minimum size) in a binary image. The groups of adjacent pixels can be determinative in whether change occurred and additional processing is not wasted on small number of pixels (e.g., below the minimum size) that are treated as noise.

If no regions of interest are detected at 624 the frame under test can be considered the new reference frame and the sequence can start again.

If regions of interest are detected at 624, then a determination can be made at 626 whether to read a full frame. If region of interest operation is being employed to conserve additional resources, then only that specific area of the region of interest is acquired at 628 and the remainder of the frame is ignored. At 630, less than all of the depth sequence can be analyzed (e.g., resource usage can be limited to the region of interest). In this case, depth can be calculated only for the region of interest and a remainder of the frame can be ignored.

In other cases where region of interest isolation is not available or is inconclusive, a full frame depth sequence can be determined at 632.

The methods described relative to FIGS. 5 and 6 provide resource-conserving depth camera management that balances resource usage and detection of noteworthy changes to the scene, while filtering out insignificant or uninteresting changes.

Various examples are described above. Additional examples are described below. One example includes a system comprising a depth camera comprising an emitter and a sensor and a controller configured to operate the emitter and the sensor of the depth camera in a first mode to obtain multiple captures of a scene and generate depth frames of the scene, compare a first depth frame of the scene to a second depth frame to determine whether the scene is changing, when the scene is unchanging, operate the sensor without the emitter in a resource-conserving mode to obtain additional captures, determine whether the scene remains unchanged by comparing a first individual additional capture to a second individual additional capture, and when the comparing is inconclusive, operate both the emitter and the sensor in an intermediate resource usage mode to obtain further captures, otherwise continue to operate only the sensor in the resource-conserving mode to obtain the further captures.

Another example can include any of the above and/or below examples where the captures and the additional captures have a same field of view or wherein the additional captures include only a subset of a field of view of the captures.

Another example can include any of the above and/or below examples where the additional captures and the further captures have the same field of view or wherein the further captures are directed to a region of interest of the field of view.

Another example can include any of the above and/or below examples where the region of interest is an area of the field of view that changed from the first individual additional capture to a second individual additional capture.

Another example can include any of the above and/or below examples where comparing the further captures can distinguish an ambient lighting change of the scene from a physical change to the scene.

Another example can include any of the above and/or below examples where comparing a first individual additional capture to a second individual additional capture comprises binning pixels of the first individual additional capture and the second individual additional capture and comparing the bins of the first individual additional capture to the bins of the second individual additional capture.

Another example can include any of the above and/or below examples where the resource-conserving mode utilizes less power than the first mode and the intermediate resource usage mode utilizes less power than the first mode and more than the resource-conserving mode.

Another example can include any of the above and/or below examples where the system further comprises an analog-to-digital converter for processing the captures, and wherein the resource-conserving mode utilizes less power than the first mode for powering the emitter, powering the sensor, and/or powering the analog-to-digital convertor.

Another example includes a method comprising operating a depth camera to obtain frames from multiple captures of a scene, comparing a first frame of the scene to a second frame of the scene to determine whether the scene is static, when the scene is static, lowering an individual frame acquisition parameter to obtain additional captures, determining whether the scene remains static by comparing individual captures, and when the determining is inconclusive, incrementally increasing resources allocated to the depth camera for additional captures until a conclusive determination is made whether the scene remains static.

Another example can include any of the above and/or below examples where the comparing a first frame of the scene to a second frame of the scene comprises comparing a first depth frame of the scene to a second depth frame of the scene.

Another example can include any of the above and/or below examples where the incrementally increasing comprises decreasing a sampling interval and/or increasing a capture area.

Another example can include any of the above and/or below examples where the conclusive determination can distinguish an ambient lighting change of the scene from a physical change to the scene.

Another example includes a depth camera comprising an emitter and a sensor and a controller configured to operate the emitter and the sensor of the depth camera in a first mode to generate depth frames of a scene from captures of the scene, compare a first depth frame of the scene to a second depth frame to determine whether the scene changed, when the scene did not change, operate the depth camera in a resource-conserving mode to obtain additional captures of the scene, attempt to make a determination whether the scene continues unchanged by comparing individual additional captures of the scene, and when the determination is inconclusive, employ incrementally more resources to obtain further additional captures until a conclusive determination is made whether the scene changed.

Another example can include any of the above and/or below examples where the resource-conserving mode utilizes less processing resources than the first mode and the incrementally more resources are associated with additional modes that are intermediate between the first mode and the resource-conserving mode.

Another example can include any of the above and/or below examples where the processing resources in the resource-conserving mode are conserved at least in part by binning groups of adjacent pixels in the additional captures and comparing corresponding bins from the additional captures rather than individual pixels.

Another example can include any of the above and/or below examples where operating the emitter and the sensor of the depth camera in the first mode to capture depth frames comprises obtaining multiple captures at multiple frequencies for the first depth frame and for the second depth frame.

Another example can include any of the above and/or below examples where the additional captures of the resource-conserving mode comprise passive captures without light from the emitter.

Another example can include any of the above and/or below examples where the incrementally increasing comprises actively illuminating the scene in the further additional captures.

Another example can include any of the above and/or below examples where the actively illuminating can allow comparison of the further additional captures to distinguish a physical change to the scene from a change in the scene resulting for a change in ambient lighting of the scene.

Another example can include any of the above and/or below examples where in the resource-conserving mode, the additional captures and the further additional captures are obtained at a slower sampling interval than a sampling interval used for the multiple captures for the first and second depth frames.

Another example can include any of the above and/or below examples where the additional captures have a same field of view as the captures of the first and second depth frames or wherein the additional captures have a smaller field of view than the captures of the first and second depth frames.

Another example can include any of the above and/or below examples where the smaller field of view comprises a region of interest that was identified by comparing the individual additional captures of the scene.

Another example can include any of the above and/or below examples where the controller causes the emitter to only illuminate the region of interest for the further additional captures.

Another example can include any of the above and/or below examples where the controller is configured to determine the scene has changed when the comparing indicates a physical object moved in the scene and not when a lighting change occurred.

Another example includes a device comprising a depth camera comprising an emitter for emitting light and a sensor for sensing light reflected from a scene and a resource-conserving camera control component configured to operate the depth camera in a resource-constrained manner to determine when the scene is changing by identifying differences between captures of the scene, and when differences between the captures are above a static confidence threshold the resource-conserving camera control component is configured to incrementally increase resource usage until a definitive determination can be made whether the scene is changing or static.

Another example can include any of the above and/or below examples where the emitter comprises a laser or a light emitting diode.

Another example can include any of the above and/or below examples where the emitter is steerable.

Another example can include any of the above and/or below examples where an illumination intensity of the emitter is adjustable.

Another example can include any of the above and/or below examples where the emitter can illuminate a field of view of a subset of the field of view.

CONCLUSION

The order in which the disclosed methods are described is not intended to be construed as a limitation, and any number of the described blocks can be combined in any order to implement the method, or an alternate method. Furthermore, the methods can be implemented in any suitable hardware, software, firmware, or combination thereof, such that a computing device can implement the method. In one case, the methods are stored on one or more computer-readable storage media as a set of instructions such that execution by a processor of a computing device causes the computing device to perform the method.

Although techniques, methods, devices, systems, etc., pertaining to depth camera resource management are described in language specific to structural features and/or methodological acts, it is to be understood that the subject matter defined in the appended claims is not necessarily limited to the specific features or acts described. Rather, the specific features and acts are disclosed as example forms of implementing the claimed methods, devices, systems, etc.

The invention claimed is:

1. A system, comprising:
   a depth camera comprising an emitter and a sensor; and,
   a controller configured to:
     operate the emitter and the sensor of the depth camera in a first mode to obtain multiple captures of a scene and generate depth frames of the scene;
     compare a first depth frame of the scene to a second depth frame to determine whether the scene is changing;
     when the scene is unchanging, operate the sensor without the emitter in a resource-conserving mode to obtain additional captures;
     determine whether the scene remains unchanged by comparing a first individual additional capture to a second individual additional capture; and,
     when the comparing is inconclusive, operate both the emitter and the sensor in an intermediate resource usage mode to obtain further captures, otherwise continue to operate only the sensor in the resource-conserving mode to obtain the further captures.

2. The system of claim 1, wherein the captures and the additional captures have a same field of view or wherein the additional captures include only a subset of a field of view of the captures.

3. The system of claim 2, wherein the additional captures and the further captures have the same field of view or wherein the further captures are directed to a region of interest of the field of view.

4. The system of claim 3, wherein the region of interest is an area of the field of view that changed from the first individual additional capture to a second individual additional capture.

5. The system of claim 4, wherein comparing the further captures can distinguish an ambient lighting change of the scene from a physical change to the scene.

6. The system of claim 5, wherein comparing a first individual additional capture to a second individual additional capture comprises binning pixels of the first individual additional capture and the second individual additional capture and comparing bins of the first individual additional capture to bins of the second individual additional capture.

7. The system of claim 1, wherein the resource-conserving mode utilizes less power than the first mode and the intermediate resource usage mode utilizes less power than the first mode and more than the resource-conserving mode.

8. The system of claim 7, further comprising an analog-to-digital converter for processing the captures, and wherein the resource-conserving mode utilizes less power than the first mode for powering the emitter, powering the sensor, and/or powering the analog-to-digital convertor.

9. A method, comprising:
   operating a depth camera to obtain frames from multiple captures of a scene;
   comparing a first frame of the scene to a second frame of the scene to determine whether the scene is static;
   when the scene is static, lowering an individual frame acquisition parameter to obtain additional captures;
   determining whether the scene remains static by comparing individual captures; and,
   when the determining is inconclusive, incrementally increasing resources allocated to the depth camera for additional captures until a conclusive determination is made whether the scene remains static.

10. The method of claim 9, wherein the comparing a first frame of the scene to a second frame of the scene comprises comparing a first depth frame of the scene to a second depth frame of the scene.

11. The method of claim 9, wherein the incrementally increasing comprises decreasing a sampling interval and/or increasing a capture area.

12. The method of claim 9, wherein the conclusive determination can distinguish an ambient lighting change of the scene from a physical change to the scene.

13. A system, comprising:
a depth camera comprising an emitter and a sensor; and,
a controller configured to:
operate the emitter and the sensor of the depth camera in a first mode to generate depth frames of a scene from captures of the scene;
compare a first depth frame of the scene to a second depth frame to determine whether the scene changed;
when the scene did not change, operate the depth camera in a resource-conserving mode to obtain additional captures of the scene;
attempt to make a determination whether the scene continues unchanged by comparing individual additional captures of the scene; and,
when the determination is inconclusive, employ incrementally more resources to obtain further additional captures until a conclusive determination is made whether the scene changed.

14. The system of claim 13, wherein the resource-conserving mode utilizes less processing resources than the first mode and the incrementally more resources are associated with additional modes that are intermediate between the first mode and the resource-conserving mode.

15. The system of claim 14, wherein the processing resources in the resource-conserving mode are conserved at least in part by binning groups of adjacent pixels in the additional captures and comparing corresponding bins from the additional captures rather than individual pixels.

16. The system of claim 13, wherein operating the emitter and the sensor of the depth camera in the first mode to capture depth frames comprises obtaining multiple captures at multiple frequencies for the first depth frame and for the second depth frame.

17. The system of claim 16, wherein the additional captures of the resource-conserving mode comprise passive captures without light from the emitter.

18. The system of claim 17, wherein the incrementally increasing comprises actively illuminating the scene in the further additional captures.

19. The system of claim 18, wherein the actively illuminating can allow comparison of the further additional captures to distinguish a physical change to the scene from a change in the scene resulting from a change in ambient lighting of the scene.

20. The system of claim 17, wherein in the resource-conserving mode, the additional captures and the further additional captures are obtained at a slower sampling interval than a sampling interval used for the multiple captures for the first and second depth frames.

21. The system of claim 13, wherein the additional captures have a same field of view as the captures of the first and second depth frames or wherein the additional captures have a smaller field of view than the captures of the first and second depth frames.

22. The system of claim 21, wherein the smaller field of view comprises a region of interest that was identified by comparing the individual additional captures of the scene.

23. The system of claim 22, wherein the controller causes the emitter to only illuminate the region of interest for the further additional captures.

24. The system of claim 13, wherein the controller is configured to determine the scene has changed when the comparing indicates a physical object moved in the scene and not when a lighting change occurred.

* * * * *